US009451240B2

(12) United States Patent
You et al.

(10) Patent No.: US 9,451,240 B2
(45) Date of Patent: Sep. 20, 2016

(54) 3-DIMENSIONAL IMAGE ACQUISITION APPARATUS AND 3D IMAGE ACQUISITION METHOD FOR SIMULTANEOUSLY OBTAINING COLOR IMAGE AND DEPTH IMAGE

(71) Applicant: Samsung Electronics Co., Ltd., Suwon-si (KR)

(72) Inventors: Jang-woo You, Yongin-si (KR); Yong-hwa Park, Yongin-si (KR); Hee-sun Yoon, Seoul (KR); Yong-chul Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 369 days.

(21) Appl. No.: 13/961,160

(22) Filed: Aug. 7, 2013

(65) Prior Publication Data

US 2014/0055565 A1    Feb. 27, 2014

(30) Foreign Application Priority Data

Aug. 27, 2012 (KR) .................. 10-2012-0093888

(51) Int. Cl.
H04N 13/02 (2006.01)
(52) U.S. Cl.
CPC ...... *H04N 13/0207* (2013.01); *H04N 13/0217* (2013.01); *H04N 13/0257* (2013.01); *H04N 13/0253* (2013.01)
(58) Field of Classification Search
None
See application file for complete search history.

(56) References Cited

U.S. PATENT DOCUMENTS

| 5,361,127 | A | | 11/1994 | Daily |
| 5,448,395 | A | * | 9/1995 | Lopez ................. G02B 3/0037 250/208.1 |
| 5,649,250 | A | | 7/1997 | Sasaki |
| 5,694,203 | A | | 12/1997 | Ogawa |
| 2007/0230944 | A1 | | 10/2007 | Georgiev |
| 2011/0080487 | A1 | | 4/2011 | Venkataraman et al. |
| 2011/0080491 | A1 | | 4/2011 | Drazic et al. |

FOREIGN PATENT DOCUMENTS

| JP | 07-140569 A | 6/1995 |
| KR | 10-2011-0084029 A | 7/2011 |
| KR | 10-2011-0099569 A | 9/2011 |
| WO | 02/49367 A2 | 6/2002 |

OTHER PUBLICATIONS

Yong-Hwa Park, et.al., "Micro optical system based 3D imaging for full HD depth image capturing," SPIE Photonics West, vol. 8252, 2012, pp. 1-15.
C. Joenathan, "Phase-measuring interferometry: new methods and error analysis," Appl. Opt., vol. 33, No. 19, Jul. 1, 1994, pp. 4147-4155.

* cited by examiner

*Primary Examiner* — Kate Luo
(74) *Attorney, Agent, or Firm* — Sughrue Mion, PLLC (57) ABSTRACT

A 3-dimensional (3D) image acquisition apparatus capable of simultaneously obtaining a color image and a depth image in a single shooting operation is provided. The apparatus includes a light source for radiating illumination light having a predetermined wavelength onto an object; a lens unit having at least four object lenses; an image sensor including at least four sensing regions for individually receiving light focused by the object lenses and for generating images; and at least three optical shutters individually facing at least three of the at least four object lenses and for modulating incident light with predetermined gain waveforms.

17 Claims, 6 Drawing Sheets

3-DIMENSIONAL IMAGE ACQUISITION APPARATUS AND 3D IMAGE ACQUISITION METHOD FOR SIMULTANEOUSLY OBTAINING COLOR IMAGE AND DEPTH IMAGE

CROSS-REFERENCE TO RELATED APPLICATION

This application claims priority from Korean Patent Application No. 10-2012-0093888, filed on Aug. 27, 2012, in the Korean Intellectual Property Office, the disclosure of which is incorporated herein in its entirety by reference.

BACKGROUND

1. Field

Apparatuses and methods consistent with exemplary embodiments relate to 3-dimensional (3D) image acquisition apparatuses and 3D image acquisition methods for simultaneously obtaining a color image and a depth image, and more particularly, to compact 3D image acquisition apparatuses capable of simultaneously obtaining a color image and a depth image in a single shooting operation so as to have a compact configuration and to increase the speed of obtaining a 3D image, and 3D image acquisition methods using the same.

2. Description of the Related Art

Currently, since 3D display apparatuses capable of displaying stereoscopic images are increasingly being developed and are in more demand, people are interested in 3D content. As such, research is being conducted on 3D image acquisition apparatuses, e.g., 3D cameras, for allowing general users to directly generate 3D content. When an object is photographed, a 3D camera may obtain an image including typical 2-dimensional (2D) color information (hereinafter referred to as a color image) and an image including depth information (hereinafter referred to as a depth image) together.

Depth information regarding distances from surfaces of an object and a 3D camera may be obtained by using a stereo vision method using two cameras or an optical triangulation method using patterned light and a camera. In the optical triangulation method, although a color image and a depth image is simultaneously obtained in a single shooting operation and thus the speed of obtaining a 3D image is high, the accuracy of depth information may be greatly reduced if a distance to an object is large, and precise depth information may not be easily obtained due to high dependency on a surface state of the object. Also, since a sufficient distance has to be ensured between a light source and a light detector, a compact configuration may not be easily achieved.

In order to solve the above problems, a time-of-flight (TOF) technology has been introduced. According to TOF technology, a TOF until light illuminates an object and light reflected from the object reaches a light receiving part and is measured. In order to extract depth information, the TOF technology includes a series of operations such as projecting light having a certain wavelength (e.g., near infrared (NIR) light having a wavelength of 850 nm) onto an object by using an illumination optical system including a light emitting diode (LED) or a laser diode (LD), receiving the light by a light receiving part light having the same wavelength as that of the projected light, and then modulating the received light by using a modulator. Various TOF technologies have been suggested according to this series of light processing operations.

However, a TOF technology requires at least three infrared (IR) images to obtain one depth image. For example, one depth image may be obtained by photographing an object by using at least three beams of IR light having the same wavelength and different phases. Accordingly, since at least three shooting operations are required to obtain one depth image, a total exposure time is increased. As such, the TOF technology is not useful to photograph a moving object.

SUMMARY

One or more exemplary embodiments provide a TOF-type 3D image acquisition apparatuses capable of simultaneously obtaining a color image and a depth image in a single shooting operation so as to have a compact configuration and to increase the speed of obtaining a 3D image and 3D image acquisition methods using the same.

Additional exemplary aspects will be set forth in part in the description which follows and, in part, will be apparent from the description, or may be learned by practice of the presented embodiments.

According to an aspect of an exemplary embodiment, a 3-dimensional (3D) image acquisition apparatus includes a light source for radiating illumination light having a predetermined wavelength onto an object; a lens unit having at least one first object lens and at least three second object lenses; an image sensor including at least one first sensing region for receiving light focused by the at least one first object lens and generating an image and at least three second sensing regions for individually receiving light focused by the at least three second object lenses and generating images; and at least three optical shutters individually facing the at least three second object lenses and for modulating incident light.

The at least one first object lens and the at least three second object lenses may be individual lenses separated from each other, and the lens unit may include a housing for fixing the separated individual lenses.

The at least one first object lens and the at least three second object lenses may be formed as a lens array sheet including the at least one first object lens and the at least three second lenses formed on one substrate.

The at least one first sensing region and the at least three second sensing regions may be formed by logically dividing an effective sensing region of one image sensor into at least four regions.

The at least one first sensing region and the at least three second sensing regions and the at least one first object lens and the at least three second object lenses may be aligned in the form of matrix arrays corresponding to each other.

The 3D image acquisition apparatus may further include a barrier disposed between the lens unit and the image sensor in order to prevent beams of light focused by different object lenses from overlapping with each other at boundaries of adjacent sensing regions.

The barrier may include two plates that are orthogonal to each other.

The 3D image acquisition apparatus may further include an infrared (IR) cut-off filter disposed in the at least one first sensing region.

The 3D image acquisition apparatus may further include band pass filters disposed on optical axes of the at least three second object lenses, and for transmitting only light within the predetermined wavelength region.

The optical shutters may be disposed between the lens unit and the object and have a size equal to or greater than a size of an effective aperture of the at least three second object lenses.

The optical shutters may be disposed between the lens unit and the image sensor.

The image sensor may be a color image sensor including color filters disposed at every pixel.

Each of the color filters may be configured to simultaneously transmit light of one of red, green, blue, cyan, magenta, and yellow and light within the predetermined wavelength region.

The light source may be an IR light source for generating IR light.

The color filters may be disposed in only the at least one first sensing region.

The 3D image acquisition apparatus may further include an image signal processing unit for generating a 3D image by using at least four images generated in the at least one first sensing region and the at least three second sensing regions; and a control unit for controlling operations of the light source and the optical shutters.

The control unit may control the at least three optical shutters to modulate incident light with gain waveforms having a same frequency as a frequency of the illumination light and having different phases from one another.

The control unit may control the at least three optical shutters in a first mode to modulate incident light with gain waveforms having a same frequency as a frequency of the illumination light and having different phases from one another, and then, in a second mode, to modulate incident light with gain waveforms having different wavelengths from the wavelength of the illumination light and having different phases from one another.

The control unit may control the at least three optical shutters to transmit incident light without modulating it in a third mode.

According to an aspect of another exemplary embodiment, a 3-dimensional (3D) image acquisition method includes projecting illumination light within a predetermined wavelength region onto an object; focusing light reflected from the object onto each of at least one first sensing region of an image sensor using at least one first object lens and at least three second sensing regions of the image sensor using at least three second object lenses; modulating light focused by the at least three second sensing regions, by using at least three optical shutters; and generating a depth image by using at least three images generated in the at least three second sensing regions, and generating a color image in the at least one first sensing regions, wherein the at least three optical shutters modulate incident light with gain waveforms having a same frequency as a frequency of the illumination light and having different phases from one another.

The 3D image acquisition method may further include disposing an infrared (IR) cut-off filter in the at least one first sensing region, so as to transmit only visible light.

The 3D image acquisition method may further include disposing band pass filters in the at least three second sensing regions, so as to transmit only light having a same wavelength region as that of the illumination light.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the embodiments are merely described below, by referring to the figures, to explain aspects of the present description.

Figure 1:
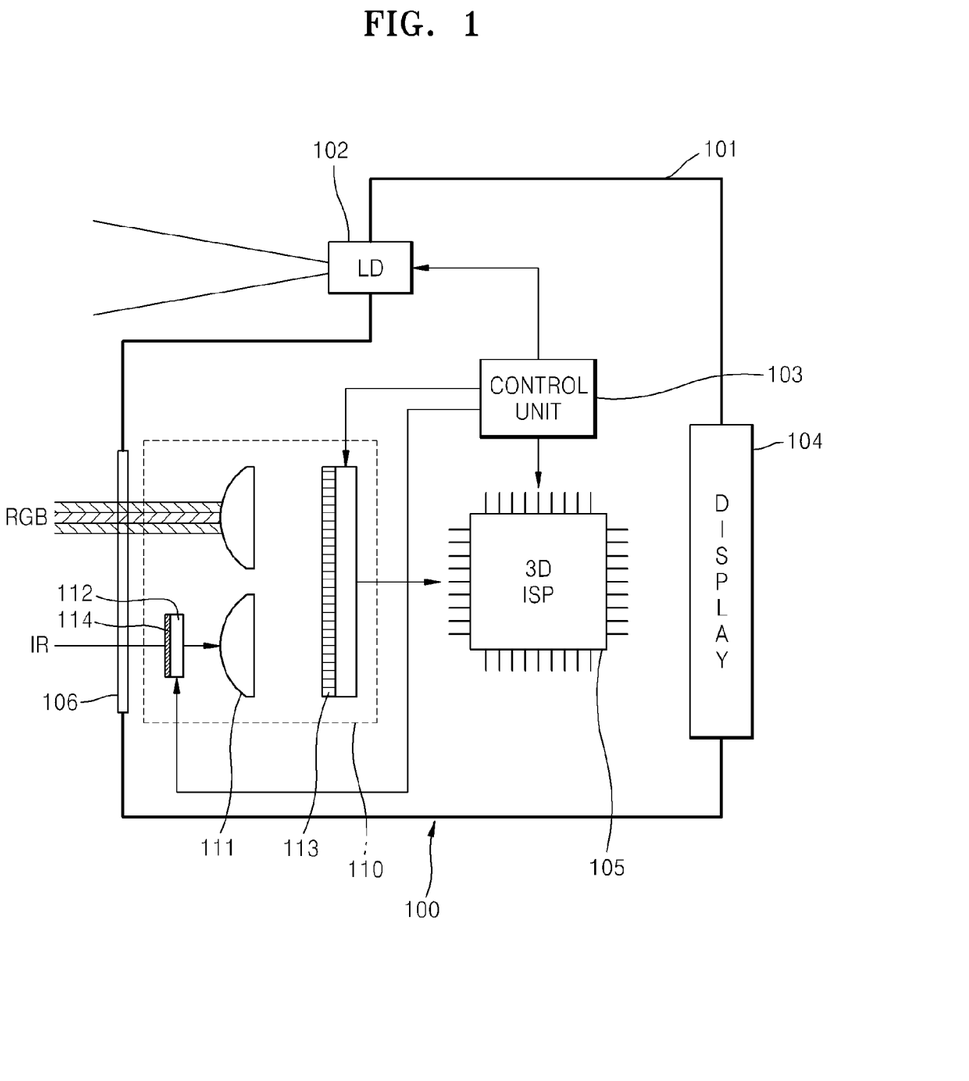
FIG. 1 is a conceptual view of a 3D image acquisition apparatus according to an exemplary embodiment.

FIG. 1 is a conceptual view of a 3D image acquisition apparatus 100 according to an exemplary embodiment. Referring to FIG. 1, the 3D image acquisition apparatus 100 may include a light source 102 for generating illumination light having a predetermined wavelength, an optical system 110 for generating a color image and a depth image by respectively using visible light and the illumination light reflected from an external object (not shown), an image signal processing unit 105 for generating a 3D image by using the color image and the depth image, and a control unit 103 for controlling operations of the light source 102, the optical system 110, and the image signal processing unit 105. Also, the 3D image acquisition apparatus 100 may further include a display panel 104 for displaying an image. The optical system 110 is disposed in a case 101, and a transparent window 106 may be disposed in a region of the case 101 facing the optical system 110, such that the visible light and the illumination light reflected from the object are incident on the optical system 110. Also, a transparent window 106 may prevent components of the optical system 110 from being exposed to the external environment.

The light source 102 may be, for example, an LED or an LD for emitting illumination light having a near infrared (NIR) wavelength of about 850 nm and invisible to human eyes for safety purposes. However, the current embodiment is not limited thereto, and illumination light having a different wavelength and another type of light source may be appropriately used. Also, the light source 102 may emit illumination light having a specially defined waveform, e.g., a sine wave, a ramp wave, or a square wave, according to a control signal received from the control unit 103.

The optical system 110 may include a lens unit 111 having at least four object lenses, an image sensor 113 for receiving light focused by each of the object lenses so as to generate an image, and at least three optical shutters 112 facing at least three of the at least four object lenses and for modulating the illumination light with predetermined gain waveforms. Also, the optical system 110 may further include band pass filters 114 for transmitting only light in the same wavelength region as that of the illumination light generated by the light source 102. Although the band pass filters 114 are shown as disposed in front of and are adjacent to the optical shutters 112 in FIG. 1, the band pass filters 114 may alternately be disposed between the optical shutters 112 and the image sensor 113. The band pass filters 114 may be disposed in only a region where the optical shutters 112 are disposed, and are not disposed in a region where the optical shutters 112 are not disposed. For example, the band pass filters 114 may be individually disposed on optical axes of the at least three object lenses facing the at least three optical shutters 112.

Figure 2:
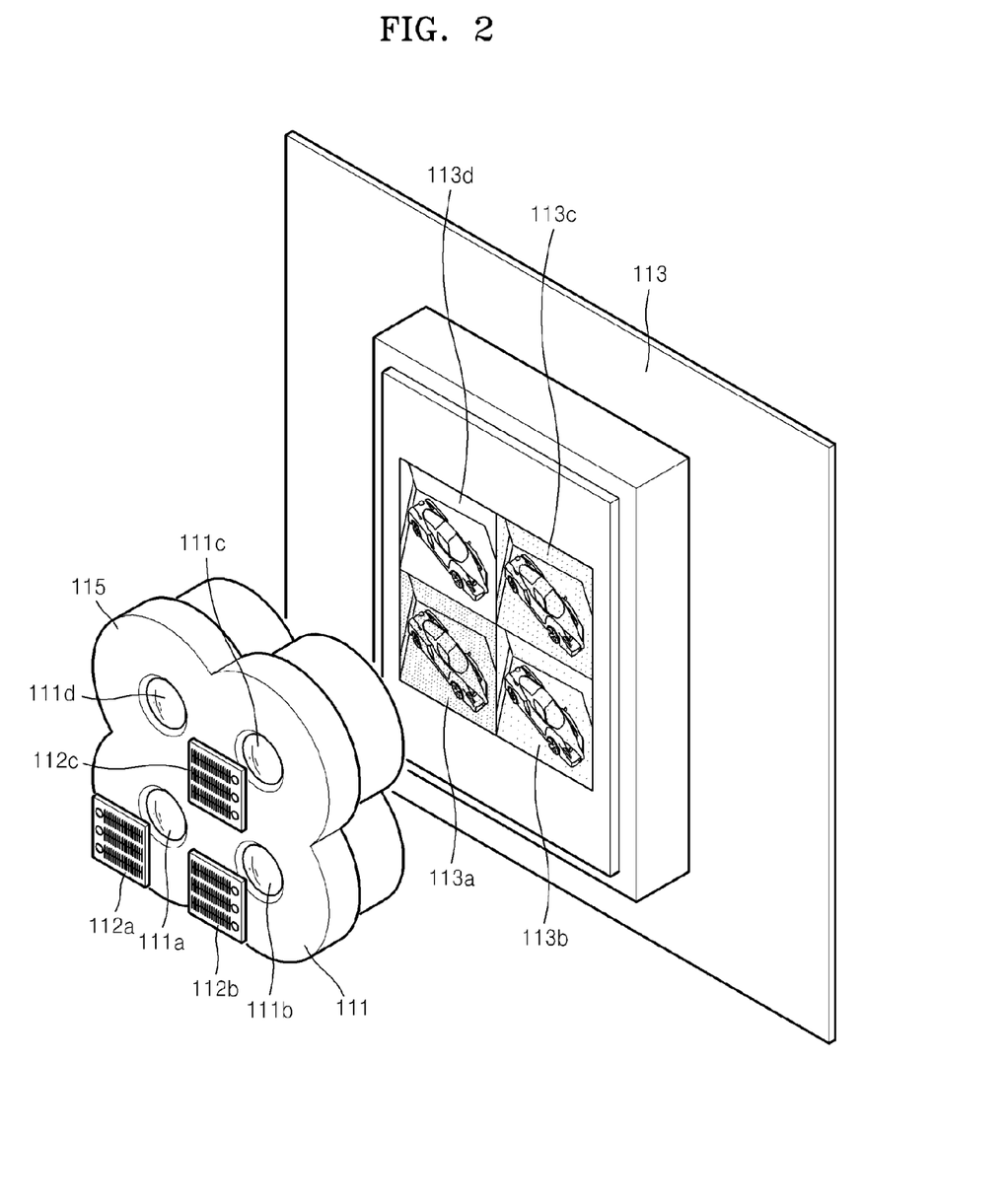
FIG. 2 is a perspective view of an optical system of the 3D image acquisition apparatus illustrated in FIG. 1, according to an exemplary embodiment.

FIG. 2 is a perspective view of the optical system 110 of the 3D image acquisition apparatus 100 illustrated in FIG. 1, according to an exemplary embodiment. Referring to FIG. 2, the lens unit 111 may include four individual object lenses, e.g., first through fourth object lenses 111a through 111d. For example, the first through fourth object lenses 111a through 111d may be fixed in a lens housing 115. Also, the first through fourth object lenses 111a through 111d may be aligned in the form of, for example, a 2×2 matrix. First through third optical shutters 112a through 112c may be respectively disposed in front of three object lenses, e.g., the first through third object lens 111a through 111c, other than one object lens, e.g., the fourth object lens 111d. The first through third optical shutters 112a through 112c modulate the amplitude of the illumination light reflected from the object with predetermined gain waveforms. For example, the first through third optical shutters 112a through 112c may be GaAs-based Fabry-Perot semiconductor modulators capable of operating at an ultrahigh speed of several ten to several hundred MHz. The gain waveforms of the first through third optical shutters 112a through 112c may have the same frequency as that of the illumination light and may have different phases from one another. The gain waveforms may be controlled by the control unit 103. For example, the phases of the gain waveforms of the first through third optical shutters 112a through 112c may be 0°, 60° and 120°, respectively. Even though three optical shutters 112a through 112c are shown in FIG. 2, it is possible to use only two optical shutters, because one optical shutter whose gain waveform has the phase of 0° may be omitted. Therefore, it should be noted that, in the following description, three optical shutters 112a through 112c are illustrated as an example of the present embodiment, but two or more optical shutters may be used according to the design the 3D image acquisition apparatus 100.

The first through fourth object lenses 111a through 111d may individually focus light onto the image sensor 113. From among four beams of light focused by the first through fourth object lenses 111a through 111d, the light focused by the fourth object lens 111d is visible light, and light focused by the first through third object lens 111a through 111c is NIR light modulated by the first through third optical shutters 112a through 112c. In order to form four images by using the four lights, the image sensor 113 may be logically divided into four sensing regions, e.g., first through fourth sensing regions 113a through 113d. That is, according to the current embodiment, instead of using four individual image sensors, an effective sensing region of a single image sensor 113 may be divided into the first through fourth sensing regions 113a through 113d. For example, the control unit 103 and the image signal processing unit 105 may extract an NIR image formed by the first object lens 111a, from coordinates corresponding to the first sensing region 113a of the image sensor 113. The first through fourth sensing regions 113a through 113d may be aligned in the form of a 2×2 matrix so as to respectively correspond to the first through fourth object lenses 111a through 111d. The image sensor 113 may be a charge-coupled device (CCD) or a semiconductor imaging device such as a complementary metal oxide semiconductor (CMOS) device.

In a typical 3D image acquisition apparatus, visible light and NIR light are split into separate paths by using a beam splitter, and an image sensor is disposed on each path to obtain a visible light image and an NIR image. However, as described above, the 3D image acquisition apparatus 100 according to the current embodiment does not need an optical configuration for splitting visible light and NIR light, and may use only one image sensor 113. Accordingly, the size and weight of the 3D image acquisition apparatus 100 may be reduced as compared to the typical 3D image acquisition apparatus.

Figure 3:
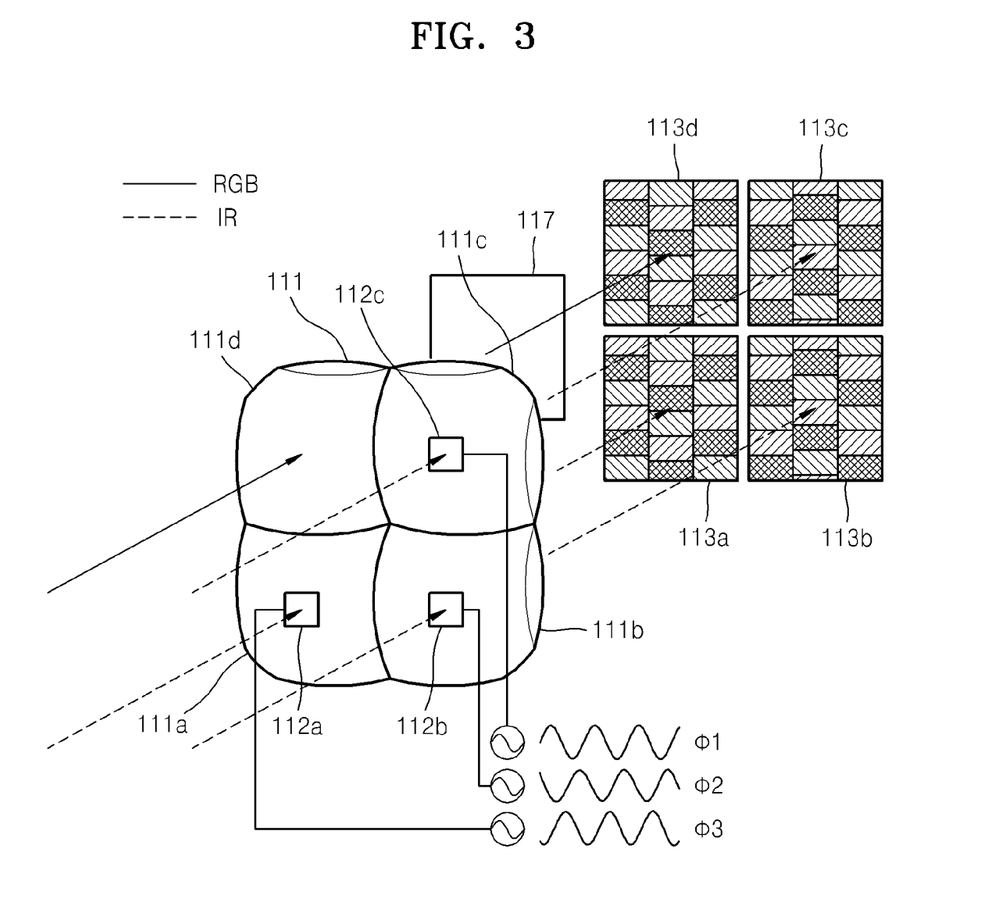
FIG. 3 is a perspective view of an optical system of the 3D image acquisition apparatus illustrated in FIG. 1, according to another exemplary embodiment.

FIG. 3 is a perspective view of the optical system 110 of the 3D image acquisition apparatus 100 illustrated in FIG. 1, according to another exemplary embodiment. Referring to FIG. 3, the lens unit 111 may be a lens array sheet in which the first through fourth object lenses 111a through 111d are formed on one substrate. If the lens unit 111 is a lens array sheet, the lens unit 111 may not require the lens housing 115 illustrated in FIG. 2. The configurations of the optical shutters 112 and the image sensor 113 may be the same as those described above in relation to FIG. 2. Meanwhile, as illustrated in FIG. 3, in the fourth sensing region 113d for obtaining a color image, an IR cut-off filter 117 for blocking light in an IR band and transmitting only visible light so as to prevent the color image from being distorted due to illumination light of an IR band may be further disposed. That is, the IR cut-off filter 117 may be disposed in the fourth sensing region 113d corresponding to the fourth object lens 111d where the first through third optical shutters 112a through 112c are not disposed, from among the first through fourth object lenses 111a through 111d. Although the IR cut-off filter 117 is illustrated as disposed between the fourth sensing region 113d and the fourth object lens 111d in FIG. 3, alternately, the IR cut-off filter 117 may be disposed in front of the fourth object lens 111d. The IR cut-off filter 117 may also be included in the optical system 110 illustrated in FIG. 2. Also, although not shown in FIG. 3, the band pass filters 114 illustrated in FIG. 1, which may be used for transmitting only IR light having the same wavelength region as that of the illumination light generated by the light source 102, may be further disposed individually between the first through third object lenses 111a through 111c and the first through third sensing regions 113a through 113c.

In FIGS. 2 and 3, the optical shutters 112 may be disposed in front of the lens unit 111, i.e., between the lens unit 111 and an object. In this case, the optical shutters 112 may have a size similar to that of a valid aperture of the first through fourth object lenses 111a through 111d. For example, the optical shutters 112 may have the same size as that of an effective aperture of the first through fourth object lenses 111a through 111d, or may have a size slightly greater than that of the effective aperture in consideration of an alignment error caused when the optical shutters 112 are aligned. Accordingly, the size of the optical shutters 112 may be much less than that of the image sensor 113. If the size of the optical shutters 112 is reduced, since an RC time constant of the optical shutters 112 is also reduced, high frequency operation can be easily achieved. That is, a frequency band of gain waveforms of the optical shutters 112 may be increased and thus the accuracy of measuring depth information may be improved.

Figure 4:
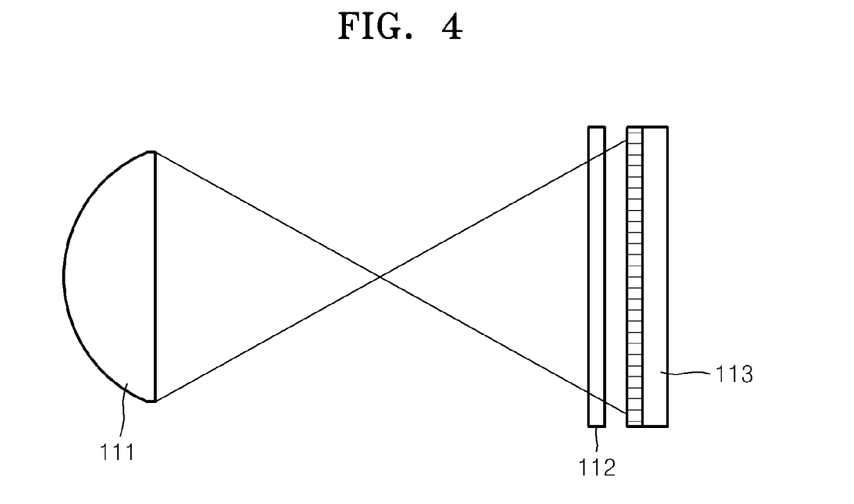
FIG. 4 is a schematic view showing a positional relationship between object lens and optical shutters in an optical system, according to another exemplary embodiment.

However, as illustrated in FIG. 4, alternately, the optical shutters 112 may be disposed between the lens unit 111 and the image sensor 113. In this case, the optical shutters 112 are disposed directly in front of the image sensor 113, and the size of the optical shutters 112 may be the same as that of the image sensor 113.

Figure 5:
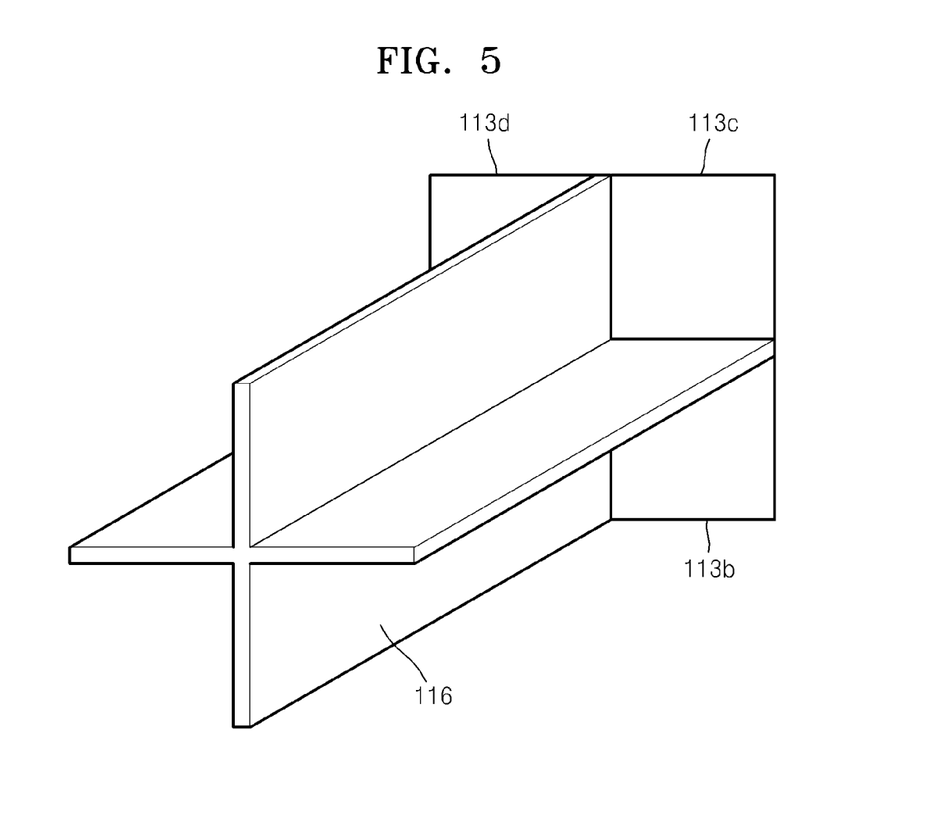
FIG. 5 is a perspective view of a barrier disposed in front of an image sensor to prevent light that passes through different object lens from being overlapped.

Meanwhile, beams of light focused by the first through fourth object lenses 111a through 111d are respectively incident on the first through fourth sensing regions 113a through 113d. However, the beams of light focused by the first through fourth object lenses 111a through 111d may overlap with each other at boundaries of the first through fourth sensing regions 113a through 113d. As such, the color image may be distorted and the accuracy of measuring the depth information may be reduced. In order to prevent the above problem, as illustrated in FIG. 5, a barrier 116 for preventing light of neighboring regions from overlapping may be disposed between the lens unit 111 and the image sensor 113. Referring to FIG. 5, the barrier 116 may include, for example, two long plates that are orthogonal to each other to have a '+'-shaped cross-section.

Figure 6:
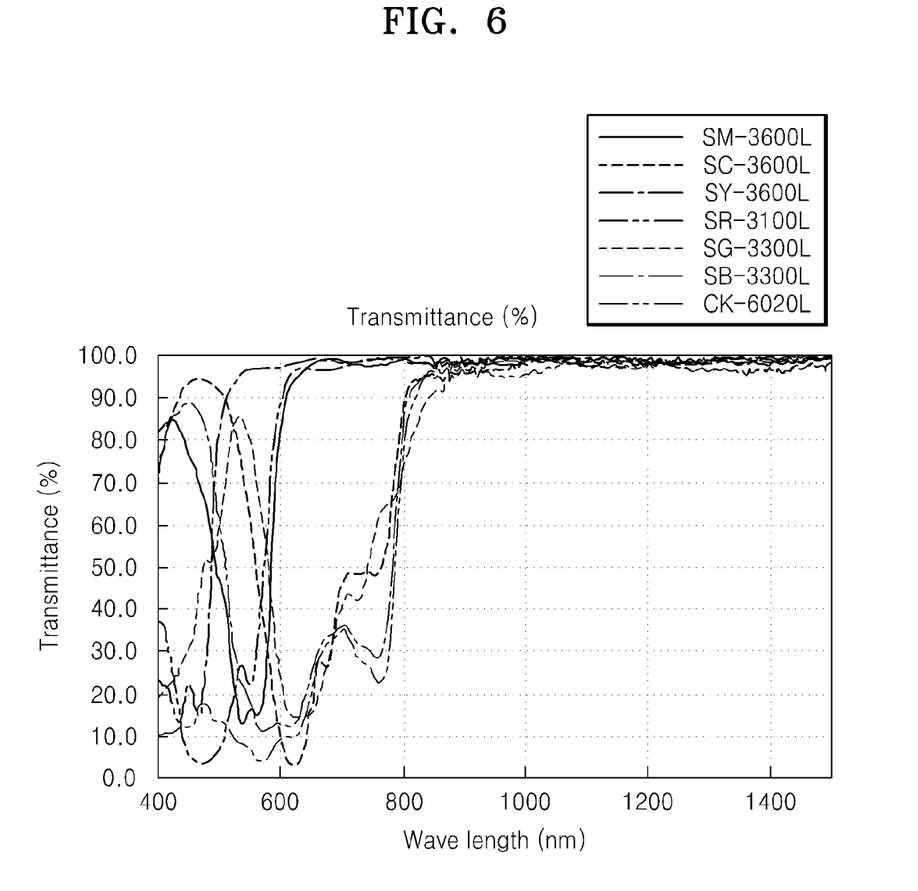
FIG. 6 is a graph showing light transmission characteristics with respect to wavelengths of color filters usable in an image sensor.

In order to obtain both a color image and a depth image, the image sensor 113 may be a color image sensor. The color image sensor may include color filters for transmitting only light of certain colors and disposed at every pixel. For example, the color image sensor may include a red color filter for transmitting only red light R, a green color filter for transmitting only green light G, and a blue color filter for transmitting only blue light B. Alternatively, the color image sensor may include a combination of color filters for transmitting light of color regions of cyan C, magenta M, yellow Y, and black K. However, as illustrated in FIGS. 2 and 3, the image sensor 113 obtains a color image in only the fourth sensing region 113d and obtains IR images in the first through third sensing regions 113a through 113c. Accordingly, at least the color filters disposed in the first through third sensing regions 113a through 113c need to transmit IR images. As such, the image sensor 113 may use color filters having transmission characteristics shown in the graph of FIG. 6. For example, the red color filter transmits red light and IR light. The other color filters may also transmit light of corresponding color regions and IR light having a wavelength equal to or less than 800 nm. Therefore, both color and IR images may be captured by using one image sensor 113.

Figure 7:
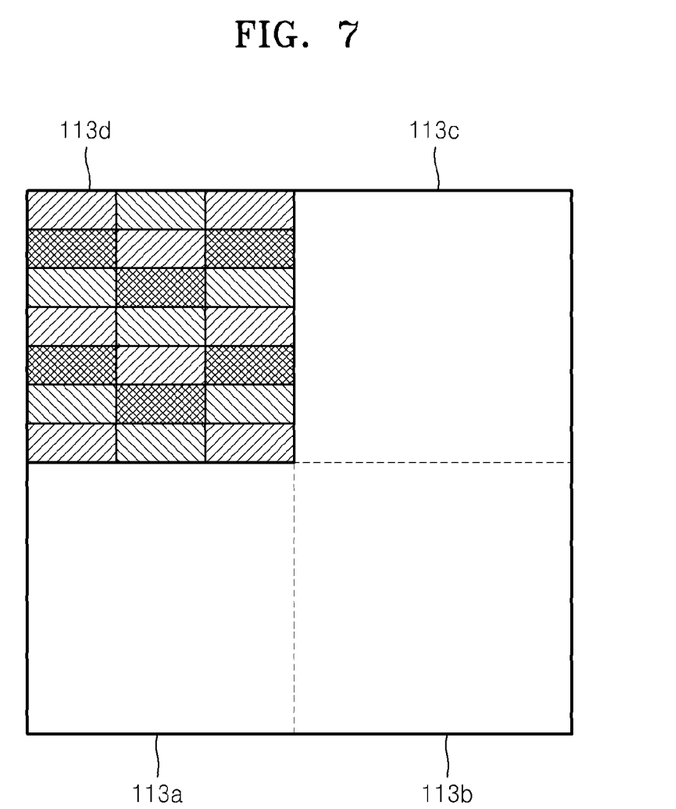
FIG. 7 is a schematic view of an image sensor in which a color filter is disposed in only a region for generating a color image.

Alternatively, as illustrated in FIG. 7, the image sensor 113, in which the color filters are disposed in only the fourth sensing region 113d and are not disposed in the first through third sensing regions 113a through 113c, may be used. That is, the color filters may be disposed in a region where the optical shutters 112 are not disposed and may be removed from or not included in regions where the optical shutters 112 are disposed. Also, if only depth information is required, since a color image is not necessary, the image sensor 113 may be a black-and-white image sensor having no color filter.

Operation of the 3D image acquisition apparatus 100 will now be described.

Initially, the light source 102 projects illumination light having a predetermined frequency onto an object by the control of the control unit 103. After that, the illumination light is reflected on the object and then is focused onto the image sensor 113 by the lens unit 111. In this case, a phase of the illumination light is delayed according to a distance (i.e., a depth) between the object and the 3D image acquisition apparatus 100. Accordingly, if a phase delay value of the illumination light is accurately measured, the distance between the object and the 3D image acquisition apparatus 100 may be obtained.

Meanwhile, visible light generated by an external light source such as the sun or a lamp and reflected by the object is also focused onto the image sensor 113 by the lens unit 111. Referring to FIGS. 2 and 3, the optical shutter 112 is not disposed and the IR cut-off filter 117 is disposed in the fourth sensing region 113d. Accordingly, a color image may be generated in the fourth sensing region 113d by using the visible light focused by the lens unit 111. On the other hand, the band pass filters 114 for transmitting only IR light having the same wavelength region as that of the illumination light, and the optical shutters 112 are disposed in the first through third sensing regions 113a through 113c. Accordingly, IR images may be generated in the first through third sensing regions 113a through 113c by using the IR light focused by the lens unit 111.

In order to calculate a phase delay value of the illumination light, the optical shutters 112 amplitude-modulate the IR light with predetermined gain waveforms by the control of the control unit 103. For example, all of the gain waveforms of the first through third optical shutters 112a through 112c may be controlled to have the same frequency as that of the illumination light emitted from the light source 102 and to have different phases from one another. As such, the IR images generated in the first through third sensing regions 113a through 113c may have different brightness levels. The IR images and the color image are transmitted to the image signal processing unit 105. The image signal processing unit 105 may generate a depth image by extracting depth information by using the IR images, and may generate a 3D image by combining the depth image and the color image.

A process of extracting depth information performed by the image signal processing unit 105 may be mathematically modeled as described below.

Initially, reflected light that is reflected off an object and returned to the 3D image acquisition apparatus 100 may be represented as follows.

$$P_{LD} = a\cos(\omega t + \phi_{obj}) + b \qquad \text{[Equation 1]}$$

In Equation 1, the unknowns are a reflectivity a of the object, an intensity b of an external light component, and a phase delay Φobj. A frequency ω of illumination light is determined by the control unit 103 and is a known value. Since there are three unknowns, at least three equations are necessary to calculate a phase delay value.

Accordingly, the first through third optical shutters 112a through 112c may modulate the reflected light represented by Equation 1 with gain waveforms having different phases, as follows.

$$T_{\phi_1} = c\cos(\omega t + \phi_1) + d \qquad \text{[Equations 2]}$$

$$T_{\phi_2} = c\cos(\omega t + \phi_2) + d$$

$$T_{\phi_3} = c\cos(\omega t + \phi_3) + d$$

In Equations 2, c is the intensity of a gain waveform, d is a direct current (DC) component of a gain waveform, and Φ1, Φ2, and Φ3 are phases of gain waveforms. 63 The reflected light after being modulated by the first through third optical shutters 112a through 112c reaches the image sensor 113 in the form of multiples of a signal represented by Equation 1 and signals represented by Equations 2. After that, the image sensor 113 may generate IR images by being exposed to the three different modulated beams of light in the first through third sensing regions 113a through 113c for a predetermined exposure time T. Brightness values of the IR images may be represented as follows.

$$I_i(\phi_{obj}) = \int_0^T P_{LD} T_{\phi_i} dt \quad \text{(Equation 3)}$$
$$= \frac{1}{2} acT\cos(\phi_{obj} + \phi_i) + bdT(i = 1, 2, 3)$$

In Equation 3, i is an identifier for identifying the three IR images generated after being modulated by the first through third optical shutters 112a through 112c.

In Equation 3, for example, if $\Phi 1=0$, $\Phi 2=\beta$, and $\Phi 3=2\beta$, the phase delay value is calculated as follows.

$$\phi_{obj} = \tan^{-1}\left\{\frac{I_3 - 2I_2 + I_1}{I_1 - I_3}\right\} \quad \text{(Equation 4)}$$

The distance between the 3D image acquisition apparatus 100 and the object may be calculated by using the phase delay value calculated in Equation 4, as follows.

$$\text{distance} = \frac{\phi_{obj}}{4\pi} fc \quad \text{(Equation 5)}$$

In Equation 5, f is a frequency of the illumination light, and c is the speed of light. In this manner, if the calculation is performed on every pixel of the image sensor 113, a depth image representing distance information may be obtained.

The 3D image acquisition apparatus 100 may use at least the first through fourth object lenses 111a through 111d and at least the first through third optical shutters 112a through 112c as described above and thus may simultaneously generate a color image and a depth image in a single shooting operation. Accordingly, the 3D image acquisition apparatus 100 may have a compact configuration due to using a TOF method, and may obtain a 3D image at a high speed due to using optical triangulation. For example, the 3D image acquisition apparatus 100 may have a simple configuration and may obtain an image of a moving object by using a TOF method.

Meanwhile, the above method of extracting distance information by using Equations 1 through 5 is merely an example of various TOF methods, and the 3D image acquisition apparatus 100 may also extract the distance information by using a different method. For example, by modulating illumination light with a plurality of gain waveforms having the same wavelength (or frequency) as that of the illumination light and having different phases in a first shooting operation, and then by modulating the illumination light with a plurality of gain waveforms having different wavelengths from that of the illumination light and having different phases in a second shooting operation, more accurate distance information may be extracted.

Also, the 3D image acquisition apparatus 100 may operate in a night shot mode in which the optical shutters 112 transmit IR light without modulating it. In this case, instead of generating a 3D image, the 3D image acquisition apparatus 100 may capture, by using IR light, an image of an object that is not easily viewed at night time when visible light is insufficient.

So far, the 3D image acquisition apparatus 100 generating both a color image and a depth image is described. However, a depth image acquisition apparatus generating only a depth image may be provided. For example, the depth image acquisition apparatus may include a light source 102, at least three object lenses 111a through 111c, at least two optical shutters 112a and 112b, and an image sensor 113 comprising at least three sensing region 113a through 113c.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A three-dimensional (3D) image acquisition apparatus comprising:
  a light source which radiates infrared (IR) light within a predetermined wavelength region onto an object;
  a lens unit comprising a first object lens and at least three second object lenses;
  an image sensor comprising a first sensing region, which receives visible light focused by the first object lens and generates a color image, and at least three second sensing regions which receive the IR light focused by the at least three second object lenses and generate at least three IR images;
  at least three optical shutters, wherein each of the at least three optical shutters is disposed on only an optical path which passes through one of the at least three second object lenses and modulates incident light, and wherein no optical shutter is disposed on an optical path passing through the first object lens;
  an image signal processing unit configured to generate a depth image using the at least three IR images and generate a 3D image using the color image and the depth image; and
  a control unit configured to control operations of the light source and the at least three optical shutters.

2. The 3D image acquisition apparatus of claim 1, wherein each of the first object lens and the at least three second object lenses comprises an individual lens, and
  wherein the lens unit comprises a housing which holds each of the individual lenses.

3. The 3D image acquisition apparatus of claim 1, wherein a single lens array sheet comprises a substrate on which a lens array sheet is formed, the lens array sheet comprising each of the first object lens and the at least three second object lenses.

4. The 3D image acquisition apparatus of claim 1, wherein a single image sensor comprises an effective sensing region logically divided into the first sensing region and the at least three second sensing regions, and wherein the first sensing region and the at least three second sensing regions are arranged in a sensing region matrix array, and the first object lens and the at least three second object lenses are aligned in a object lens matrix array corresponding to the sensing region matrix array.

5. The 3D image acquisition apparatus of claim 1, further comprising a barrier disposed between the lens unit, wherein the barrier prevents light focused by different object lenses from overlapping with each other.

6. The 3D image acquisition apparatus of claim 1, further comprising an IR cut-off filter disposed in the first sensing region.

7. The 3D image acquisition apparatus of claim 1, further comprising at least three band pass filters, wherein each of the at least three band pass filters is disposed on an optical axis of one of the at least three second object lenses and transmits only light within the predetermined wavelength region.

8. The 3D image acquisition apparatus of claim 1, wherein each of the at least three optical shutters is disposed between the lens unit and the object and has a size equal to or greater than a size of an effective aperture of each of the at least three second object lenses.

9. The 3D image acquisition apparatus of claim 1, wherein each of the at least three optical shutters is disposed between the lens unit and the image sensor.

10. The 3D image acquisition apparatus of claim 1, wherein the image sensor is a color image sensor comprising color filters disposed at every pixel, and each of the color filters is configured to simultaneously transmit light of one of red, green, blue, cyan, magenta, and yellow, and light within the predetermined wavelength region.

11. The 3D image acquisition apparatus of claim 1, wherein image sensor comprises color filters disposed at every pixel in the at least one first image sensing region.

12. The 3D image acquisition apparatus of claim 1, wherein the control unit controls the at least three optical shutters to modulate incident light with gain waveforms having a wavelength within the predetermined wavelength region and having different phases from one another.

13. A three-dimensional (3D) image acquisition apparatus comprising:
    a light source which radiates illumination light within a predetermined wavelength region onto an object;
    a lens unit comprising at least one first object lens and at least three second object lenses;
    an image sensor comprising a first sensing region, which receives visible light focused by the at least one first object lens and generates an image, and at least three second sensing regions which light focused by the at least three second object lenses and generate images;
    at least three optical shutters, wherein each of the at least three optical shutters is disposed on an optical path which passes through one of the at least three second object lenses and modulates incident light;
    an image signal processing unit configured to generate a 3D image by using at least four images generated in the at least one first sensing region and the at least three sensing regiong; and
    a control unit for controlling operations of the light source and the at least three optical shutters,
    wherein the control unit controls the at least three optical shutters in a first mode to modulate incident light with gain waveforms having a wavelength within the predetermined wavelength region and having different phases from one another, and then controls the at least three optical shutters in a second mode to modulate incident light with gain waveforms having a wavelength different from the predetermined wavelength region and having different phases from one another.

14. The 3D image acquisition apparatus of claim 1, wherein the control unit controls the at least three optical shutters to transmit incident light without modulating it in a third mode.

15. A three-dimensional (3D) image acquisition method comprising:
    projecting infrared (IR) light within a predetermined wavelength region onto an object;
    focusing visible light reflected from the object onto one first sensing region of an image sensor using a first object lens and focusing the IR light reflected from the object onto each of at least three second sensing regions of the image sensor using at least three second object lenses;
    modulating the IR light focused by the at least three second object lenses using at least three optical shutters;
    generating a depth image by using at least three IR images generated in the at least three second sensing regions, and generating a color image by using an image generated in the first sensing region; and
    generating a 3D image using the color image and the depth image,
    wherein the at least three optical shutters modulate incident light with gain waveforms having a wavelength within the predetermined wavelength region and having different phases from one another, and
    wherein each of the at least three optical shutters is disposed on only an optical path which passes through one of the at least three second object lenses, and no optical shutter is disposed on an optical path which passes through the first object lens.

16. The 3D image acquisition method of claim 15, further comprising disposing an IR cut-off filter in the one first sensing region, so as to transmit only visible light.

17. The 3D image acquisition method of claim 15, further comprising disposing at least three band pass filters to correspond to at least three second sensing regions, so as to transmit only light having a same wavelength within the predetermined wavelength region.

* * * * *